April 9, 1940.  W. B. ATKINSON  2,196,407
GASKET MATERIAL
Filed May 6, 1936
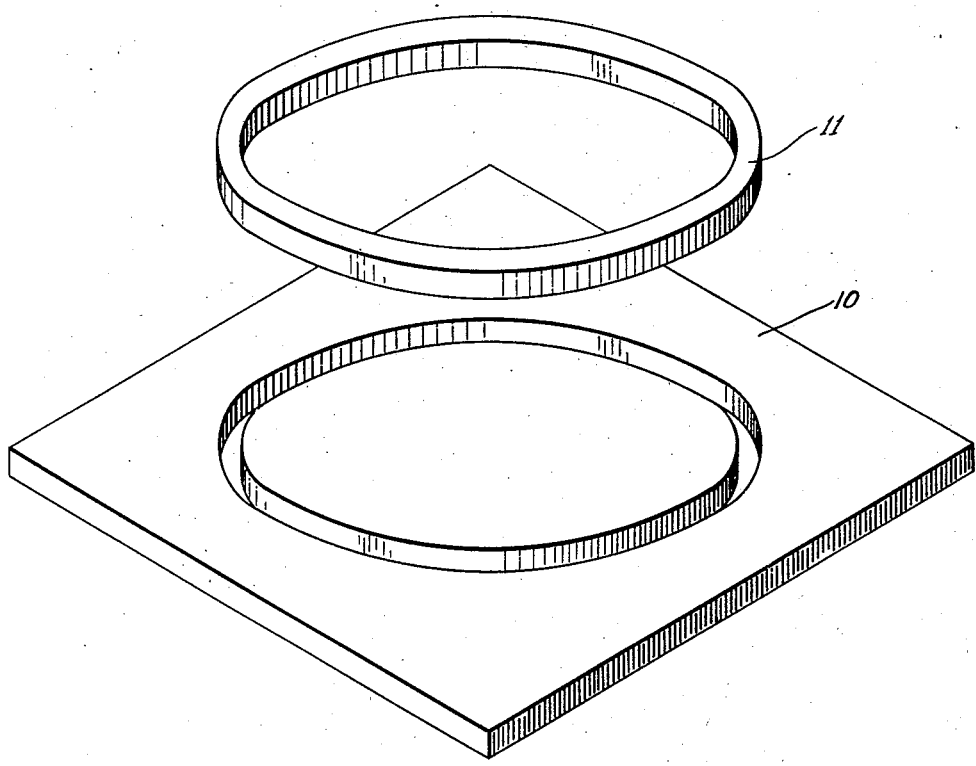
WITNESSES:
INVENTOR
William B. Atkinson.
BY
ATTORNEY Patented Apr. 9, 1940

2,196,407

UNITED STATES PATENT OFFICE 2,196,407

GASKET MATERIAL

William B. Atkinson, Pittsburgh, Pa., assignor to Westinghouse Electric & Manufacturing Company, East Pittsburgh, Pa., a corporation of Pennsylvania Application May 6, 1936, Serial No. 78,106

10 Claims. (Cl. 106—8)

The invention relates generally to a resilient material primarily intended for the making of gaskets.

The object of the invention is to provide a gasket material which retains its resiliency under pressure and its capacity to resist the penetration of oil when exposed to hot oils.

For a fuller understanding of the object of the invention, reference may be had to the following detailed description, taken in connection with the accompanying drawing, in which The single figure is a perspective view of a product made from the new composition of matter.

Much of our present day electrical apparatus is operated immersed in a dielectric such as a light fraction oil. Transformers, circuit breakers and regulators are good examples of electrical apparatus that is operated while immersed in oil.

In order to keep the dielectric or oil in proper condition, a closed case is provided and in order to make the case leakproof, gaskets are required. These gaskets are exposed to both pressure and hot oil and the gasket material heretofore supplied has had a very short useful life.

In making the present gasket material, I employ 25% to 75% by weight of a synthetic rubber such, for example, as a polymerized chloroprene, one of which is well known to the art under the trade name Du Prene. Into this polymerized chloroprene, I knead from about 25% to 75% by weight of cork in a comminuted form, preferably in shredded form, of the kind generally sold to the trade.

The method generally employed in mixing the polymerized chloroprene and cork in a comminuted form is that ordinarily employed in the mixing of rubber. For example, a quantity of the polymerized chloroprene may be applied to rolls and converted into a band running slowly around the rolls.

The shredded cork is then thrown upon the band of polymerized chloroprene and gradually worked or kneaded into it. When the cork has been embodied in the polymerized chloroprene, the band of material is removed from the rolls and placed in a mold where it is subjected to heat and pressure to consolidate it into a resilient mass. This treatment is the equivalent of the well known vulcanizing process employed with rubber. In heat treating the chloroprene carrying the shredded cork, it is good practice to employ a temperature of about 165° C. and a pressure of about 60 pounds per square inch or sufficient to close the molds for about ½ hour.

It has been found that generally about equal proportions by weight of cork and polymerized chloroprene give a composition of matter having the characteristics required for gasket packing and other similar uses.

It will be readily appreciated that the material may be molded into any predetermined shape or it may be molded into sheets or blocks and cut to any predetermined shape depending on the purpose for which the finished article is to be employed. In the figure, a sheet of the new material 10 is shown with an annular gasket 11 cut therefrom. This is not the most efficient way to make gaskets but may be employed. In making them for commercial use, the material may be cut in strips of the proper cross-section and the ends spliced to make a ring.

While a mixture of polymerized chloroprene and shredded cork has been found suitable for many purposes, it has been found advisable for some purposes to utilize fillers and antioxidants. There are many fillers available to the trade and the one which I prefer to employ is carbon black with or without other fillers.

When a filler such as carbon black is employed, it is mixed with the cork and kneaded into the polymerized chloroprene on the rolls. A filler such as carbon black gives toughness and added oil resistance to the material and helps it to retain its resiliency.

In order to give long life to the gasket, antioxidants such as pyridine may be added to the mixture of cork and carbon black or to the cork alone. The amount of the filler such as carbon black employed will depend on the use to which the composition is to be subjected. For ordinary purposes, about 5% to 20% by weight of a suitable filler gives satisfactory results. The antioxidant may be introduced into the mixture in the same manner as the filler, that is, by mixing it with the cork and kneading it into the polymerized chloroprene. The amount of anti-oxidant will depend on the product desired. Generally, from traces to 10% by weight is beneficial.

The gasket material made in this manner has great capacity to resist the penetration of hot oils and to retain its resiliency under pressure. A theory explaining why it resists hot oils and retains its resiliency is not required for the manufacture and use of the gasket material.

Polymerized chloroprene is of itself resilient but to some extent loses this resiliency when exposed to hot oil. It is believed that the cork, which is so thoroughly embodied in and mixed through the chloroprene, helps to protect the mass of the latter from the oil. In this manner, a gasket material having all the desired characteristics for use with electrical and other appatus is obtained.

The use of fillers will give the final material greater toughness while the use of antioxidants will prevent the material from becoming oxidized and will thereby prevent aging.

I claim as my invention:

1. A gasket material comprising about 50% by weight of shredded cork embodied in about 50% by weight of polymerized chloroprene to give resiliency to the material, the whole being consolidated into a resilient mass capable of retaining its resiliency under pressure.

2. A gasket material comprising about 71% to 24% by weight shredded cork and about 5% to 20% by weight of a filler, both embodied in 24% to 71% polymerized chloroprene, the cork being employed to give the material resiliency and consolidated into a resilient mass capable of retaining its resiliency under pressure.

3. A gasket material comprising about 51% to 20% by weight shredded cork, about 5% to 20% by weight of a filler and from traces to 10% by weight of an antioxidant embodied in about 45% to 55% by weight of a polymerized chloroprene, the cork being employed to give the material resiliency, the whole being consolidated into a resilient mass capable of retaining its resiliency under pressure.

4. A gasket material comprising from about 75% to 25% by weight of shredded cork embodied in from about 25% to 75% by weight of a polymerized chloroprene, the cork being employed to give the material resiliency, the whole being consolidated into a mass capable of retaining its resiliency under pressure.

5. A gasket material comprising from 22½% to 47½% by weight of shredded cork, about 20% to 5% by weight carbon black as a filler to toughen the final material, pyridine in an amount from 10% by weight to traces to prevent oxidation of the final material, all of these materials being embodied in from about 47½% to 67½% by weight polymerized chloroprene, the cork being employed to give the material resiliency, the whole being consolidated into a mass capable of retaining its resiliency under pressure.

6. A gasket material comprising about 35% by weight or more shredded cork, a filler such as carbon black for giving toughness and added oil resistance to the final material and an antioxidant such as pyridine for preventing the oxidation of the final product embodied in about 50% by weight or more polymerized chloroprene, the cork being employed to give the gasket material resiliency, the whole being consolidated into a mass capable of retaining its resiliency under pressure.

7. A gasket material comprising shredded cork intimately mixed with chloroprene, the cork being employed to give the gasket material resiliency, the material being consolidated into a resilient mass capable of retaining its resiliency under pressure.

8. A gasket material comprising a comminuted cork and a filler intimately mixed with a polymerized chloroprene, the comminuted cork being in a form to give the gasket material resiliency, the whole being consolidated into a mass capable of retaining its resiliency under pressure.

9. A gasket material comprising a comminuted cork and lamp black intimately mixed with a polymerized chloroprene, the comminuted cork being in a form adapted to give the gasket material resiliency, the whole being consolidated into a mass capable of retaining its resiliency under pressure.

10. A cork composition comprising cork granules and polymerized chlorobutadiene in amount to constitute a binder, said cork predominating by volume.

WILLIAM B. ATKINSON.